United States Patent [19]

Eidler et al.

[11] Patent Number: 5,601,943
[45] Date of Patent: Feb. 11, 1997

[54] MODULE FOR AN AQUEOUS BATTERY SYSTEM

[75] Inventors: Phillip A. Eidler, Muskego; Eric Loppnow, Milwaukee, both of Wis.

[73] Assignee: ZBB Technologies, Inc., Wauwatosa, Wis.

[21] Appl. No.: 548,490

[22] Filed: Oct. 26, 1995

[51] Int. Cl.⁶ .................................................. H01M 6/04
[52] U.S. Cl. ...................... 429/163; 429/59; 429/84; 429/95; 429/101; 429/102; 429/105; 429/153; 429/155; 429/176; 429/177; 429/193
[58] Field of Search ........................ 429/59, 84, 95, 429/101, 102, 105, 121, 153, 154, 155, 163, 176, 177, 193

[56] References Cited

U.S. PATENT DOCUMENTS

| | | |
|---|---|---|
| 2,615,062 | 10/1952 | Craig . |
| 4,184,007 | 1/1980 | Urry . |
| 4,216,275 | 8/1980 | Hartmann et al. ............... 429/104 |
| 4,269,905 | 5/1981 | Wedlake . |
| 4,303,745 | 12/1981 | Anderson et al. . |
| 4,310,607 | 6/1982 | Shay ................................... 429/104 |
| 4,394,423 | 7/1983 | Ledjeff . |
| 4,497,880 | 2/1985 | Kraft et al. . |
| 4,873,159 | 10/1989 | Ciriello . |
| 5,270,136 | 12/1993 | Noland . |
| 5,413,881 | 5/1995 | Licht et al. ....................... 429/105 |

*Primary Examiner*—M. Nuzzolillo
*Attorney, Agent, or Firm*—Godfrey & Kahn, S.C.

[57] ABSTRACT

A module for liquid electrolyte, electric energy storing devices. The module includes a double-walled container having an innerwall and an outerwall and a rim. The container includes a first well for holding liquid electrolyte electric energy storing devices and which is defined by the inner wall. The container also includes a first electrolyte reservoir having a shelf and a lid for covering the first reservoir. The innerwall and outerwall define a second electrolyte reservoir which surrounds the first electrolyte reservoir so that the first and second reservoirs are in nested relationship. The reservoirs are designed so that a physical puncture of the module will cause the electrolyte from the first reservoir to mix with the electrolyte from the second before it leaks from the module.

13 Claims, 5 Drawing Sheets

MODULE FOR AN AQUEOUS BATTERY SYSTEM

BACKGROUND OF THE INVENTION

1. Field of the Invention

The present invention relates to modules for liquid electrolyte, electric energy storing devices, such as batteries. More particularly, the present invention relates to a module for an aqueous battery system wherein the system includes liquid electrolyte batteries and reservoirs for holding liquid electrolyte.

2. Description of the Prior Art

Present liquid electrolyte battery systems include batteries coupled in fluid-flowing relation to external reservoirs. The reservoirs hold electrolyte which is cycled to the battery to support the charge and discharge reactions. The electrolyte contains one or more chemical reactants. For example, in a flowing electrolyte, zinc-bromine battery, aqueous zinc-bromine and quaternary ammonium salts, for example, methylethylpyrrolidinium bromide, with optional supporting salts, such as $NH_4Cl$, is circulated to the battery from external reservoirs.

Internally, the batteries include a stack of cells which is made from a series of alternating electrodes and ion-permeable separators. In bipolar, zinc-bromine batteries each cell includes a bipolar electrode upon which an anodic reaction and a cathodic reaction occurs. For purposes of discussion, the anodic side of the bipolar electrode is called an anode, and the cathodic side of the bipolar electrode is called a cathode.

While the battery is charged, the following chemical reaction takes place:

$$Zn^{++}+2e^- \rightarrow Zn$$

$$2Br^- \rightarrow Br+2e^-$$

Zinc is plated on the anode, and bromine is evolved on the cathode. The bromine is immediately complexed by quaternary ammonium ions in the electrolyte to form a dense second phase which is removed from the battery stack with the flowing electrolyte. The complexed bromine is stored in a catholyte reservoir. The bromine evolved during the reaction is complexed in order to lower its chemical reactivity. However, the complexed bromine is still a relatively hazardous and caustic material.

While the battery is discharged, the following reaction takes place:

$$Br_2+2e^- \rightarrow 2\ Br^-$$

$$Zn \rightarrow Zn^{++}+2e^-$$

Zinc is oxidized and the released electrons pass through the electrode where they combine with molecular bromine to form bromine ions. Positively charged zinc ions travel through the separator and remain in solution, and at the same time, negatively charged bromine ions pass through the separator in the opposite direction and remain in solution.

As should be apparent, one important objective in liquid electrolyte battery design is to prevent and minimize the effects of electrolyte leaks. Present techniques for containing bromine leaks in zinc-bromine batteries include placing the reservoirs, batteries, and plumbing (which connects the reservoirs to the batteries) within a spill tray. The spill tray also acts as a module in which all the components are mounted and by which they may be moved as a complete, portable system.

However, when placed in a spill tray, the components of a flow battery are all exposed to the environment. Accordingly, liquid bromine, and bromine gas formed from liquid bromine, may still escape from the system, thereby creating a hazard to people and the environment.

In addition, the spill tray technique of integrating batteries, reservoirs, and plumbing into a system is inadequate because it does not include any means for minimizing the results of a reservoir puncture which may occur, for example, while battery modules are transported or otherwise handled.

Accordingly, it would be desirable to have an improved module for supporting and containing the components of an operational, flowing electrolyte battery. Those components include the batteries, electrolyte containing reservoirs, and plumbing connecting the reservoirs and batteries. In addition, it would be desirable to have an improved module which contains substantially more gaseous bromine from bromide leaks than prior-art devices, and which has a means for minimizing, or is designed to minimize, the results of physical punctures to the reservoirs of the battery.

OBJECTS AND SUMMARY OF THE INVENTION

Therefore, it is an object of the present invention to provide an improved module for supporting and containing the components of an operational, flowing electrolyte battery.

A further object of the present invention is to provide an improved module for an operational, flowing electrolyte battery which contains gaseous bromine created by bromine leaks from the components of the battery.

A further object of the present invention is to provide an improved module for an operational, flowing electrolyte battery which is designed to minimize the results of physical punctures to the reservoirs of the battery.

These and other objects and advantages are achieved in a module of the present invention which includes a double-walled container having an innerwall, and an outerwall in spaced relation thereto. The container also includes a first well or compartment, a second well or compartment, and a rim. A lid is mounted on the rim in covering relation to the first and second wells or compartments.

The outerwall is cross-sectionally C-shaped. The innerwall is a cross-sectionally E-shaped and integral with the outerwall. The innerwall defines the two compartments.

The first compartment is designed to hold a plurality of electric energy storing devices, such as batteries. The second compartment is designed to hold liquid electrolyte and acts as a first electrolyte reservoir. The second compartment, or first electrolyte reservoir, has a top opening having a peripheral edge. The innerwall defines a ledge around at least a portion of the peripheral edge of the top opening, and a lid is mounted on the ledge. The lid for the second compartment is designed to support a variety of components including connective plumbing, and electrolyte pumps. In the preferred embodiment, at least one pump is mounted on the lid for the second compartment.

The inner and outer walls define a second electrolyte reservoir which has a top portion having an opening therein. The opening has a peripheral edge around which may be mounted a lid for the second reservoir. The second electrolyte reservoir lid is designed to support a variety of components including connective plumbing, and electrolyte pumps. In the preferred embodiment, at least one pump is mounted on the second electrolyte reservoir lid.

The second electrolyte reservoir surrounds the second compartment, or first electrolyte reservoir. The reservoirs are positioned in a nested relationship, one within the other, so that a physical puncture of the module will cause the electrolyte from the first reservoir to mix with the electrolyte from the second before it leaks from the module. The container of the module is designed to be sealed or covered with appropriate lids so that the components held within the module are sheltered from external environmental agents, such as wind, dust, water, and sun. In addition, the lids seal the container so as to contain more gaseous electrolyte within the module than most prior-art modules are capable of containing.

DETAILED DESCRIPTION

Figure 1:
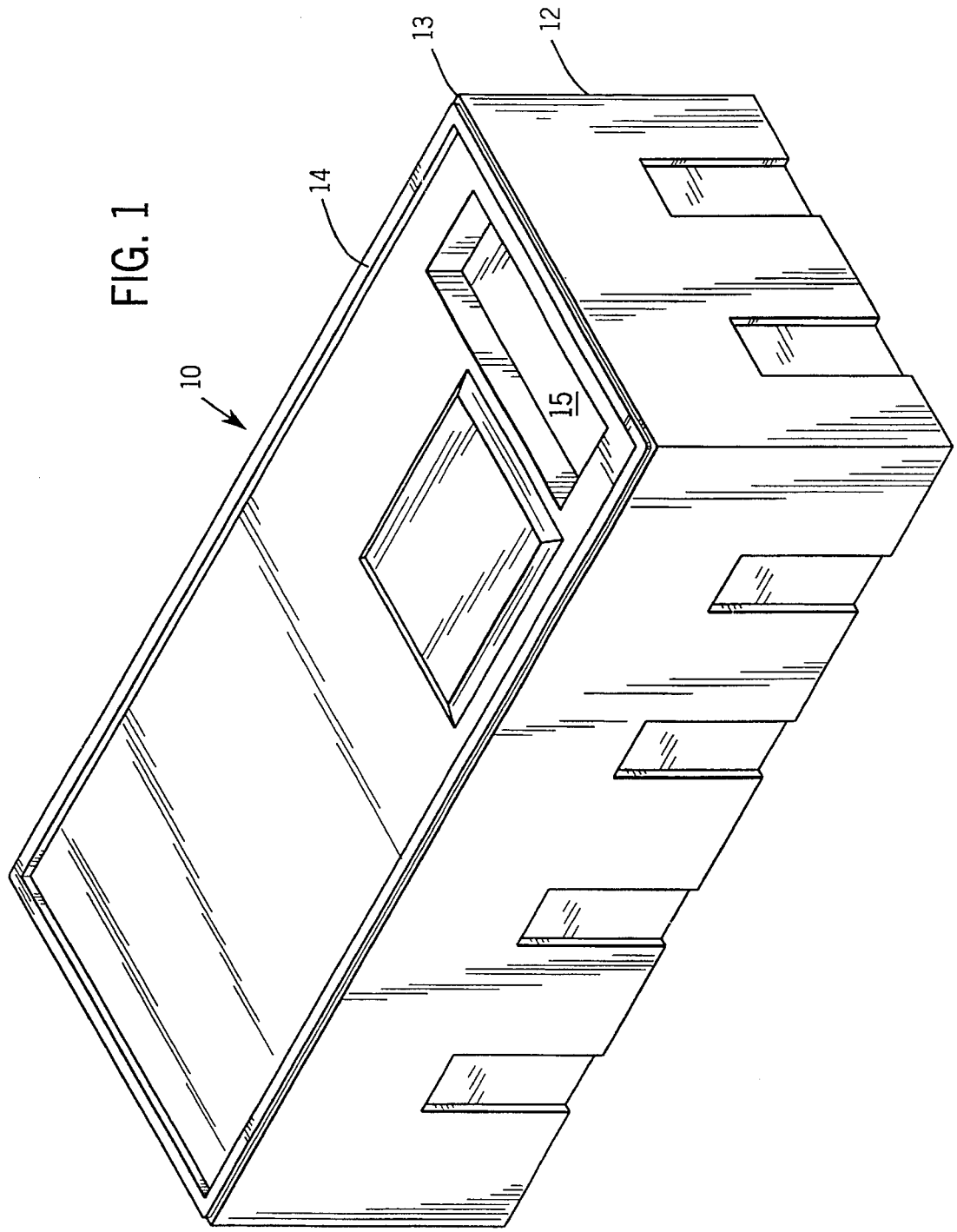
FIG. 1 is a right perspective, environmental view of the module of the present invention.

Referring more particularly to the drawings, a module of the present invention is designated generally by the numeral 10 in FIG. 1. The module includes a double-walled container 12 which includes a rim 13. The container 12 may be approximately 26 inches tall, 38 inches wide, and 84 inches long. The rim 13 supports a lid or cover 14. The cover 14 may include a recessed area 15 in which a control box (not shown) containing circuitry or electronics may be stored. The control box is used to control electrolyte pumps, which are discussed below.

Figure 2:
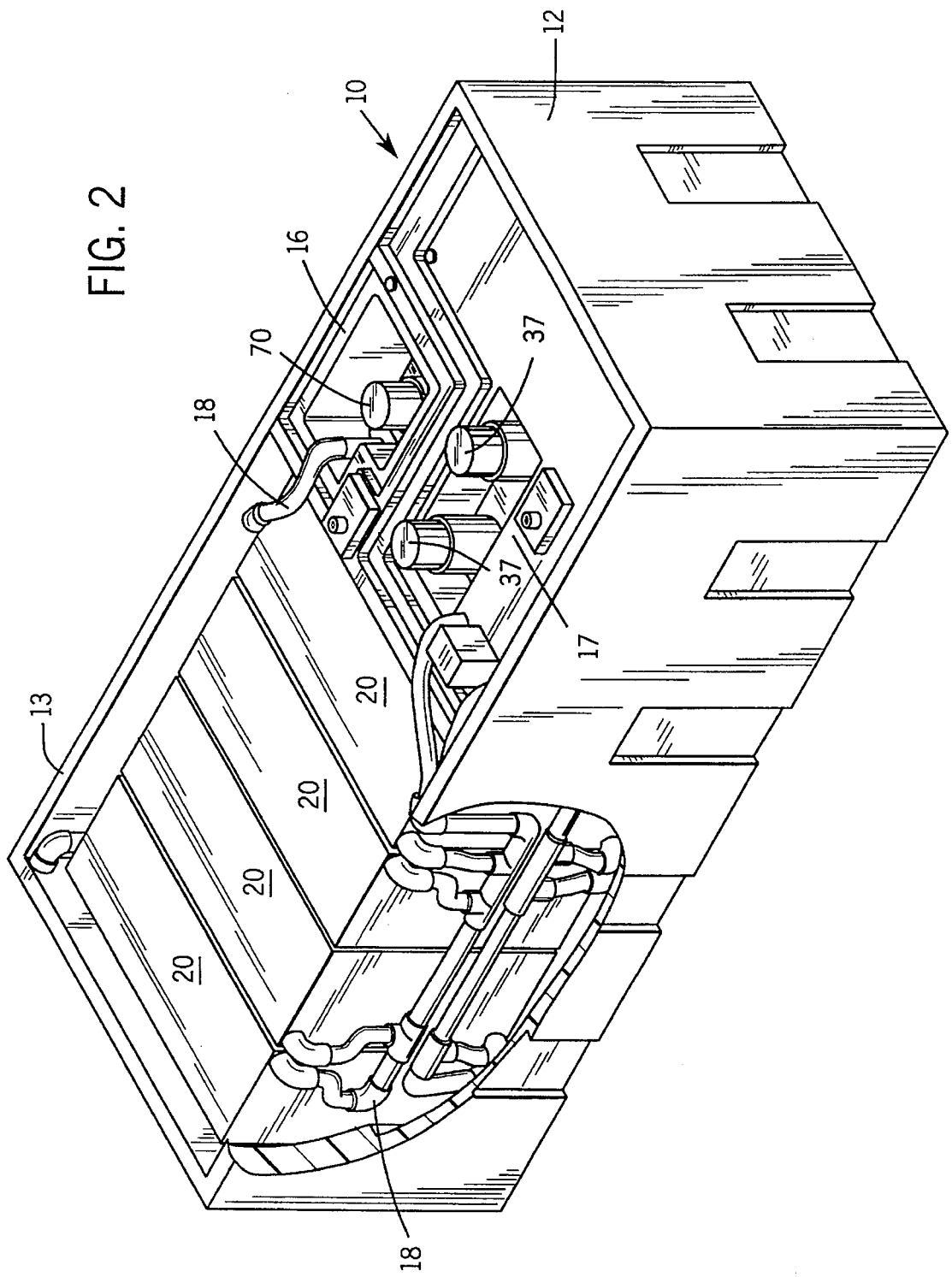
FIG. 2 is a right perspective, environmental, partially cut away view of the module of the present invention.

As can be seen by reference to FIG. 2, the module 10 includes an anolyte reservoir 16 and a catholyte reservoir 17. Plumbing 18 couples the reservoirs 16 and 17 in fluid flowing relation to a plurality of batteries 20.

Figure 3:
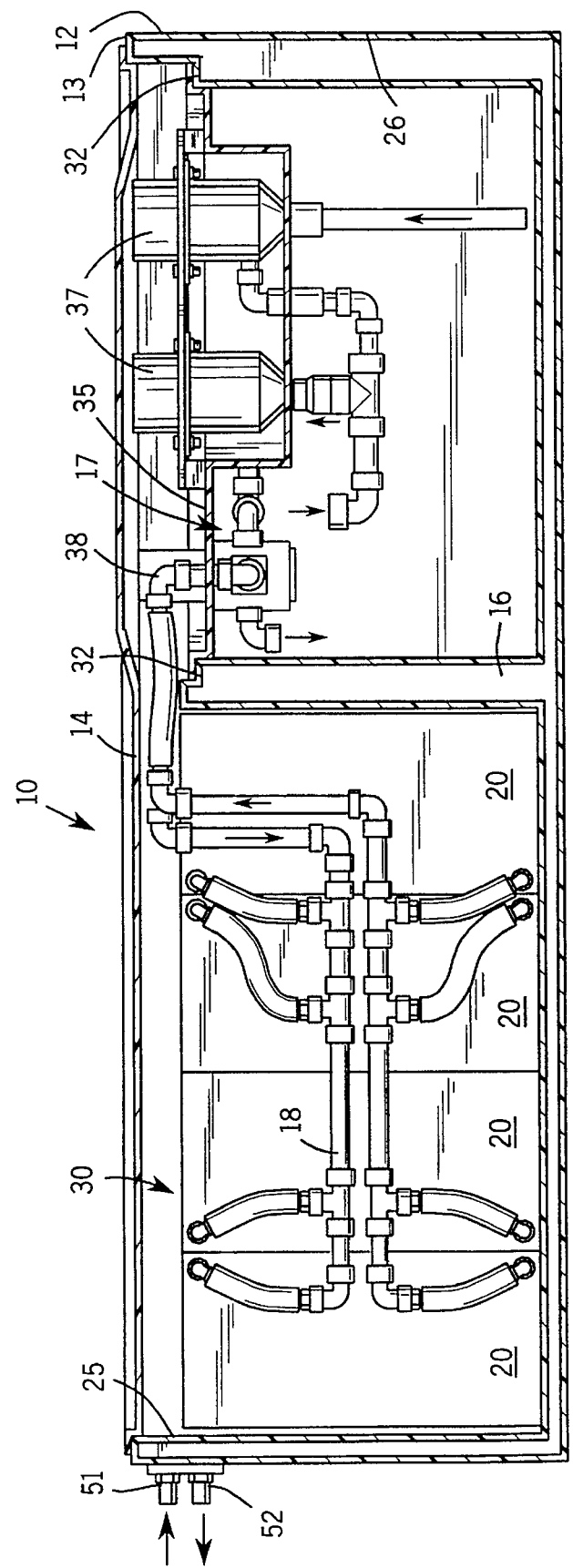
FIG. 3 is a front, cross-sectional view of the module of the present invention.

The double-walled container 12 includes an innerwall 25 and an outerwall 26 in spaced relation thereto (FIG. 3). In the preferred embodiment, the innerwall and outerwall are each about ¼" thick. The innerwall 25 is integral with the outerwall 26 and the walls meet to form the rim 13. In cross-section, the innerwall 25 is E-shaped and defines a first well or compartment 30 and a second well or compartment which is the catholyte reservoir 17. The first compartment 30 is capable of holding the batteries 20. As noted, the second compartment is the catholyte reservoir 17 and it includes a ledge or shelf 32. Mounted on the shelf 32 is a lid or cover 35. As can be seen more clearly by reference to FIG. 5, the cover 35 includes a plurality of openings 36. A pair of catholyte pumps 37 are individually mounted on two of the openings, and a plumbing fixture 38 is mounted on another of the openings.

Figure 4:
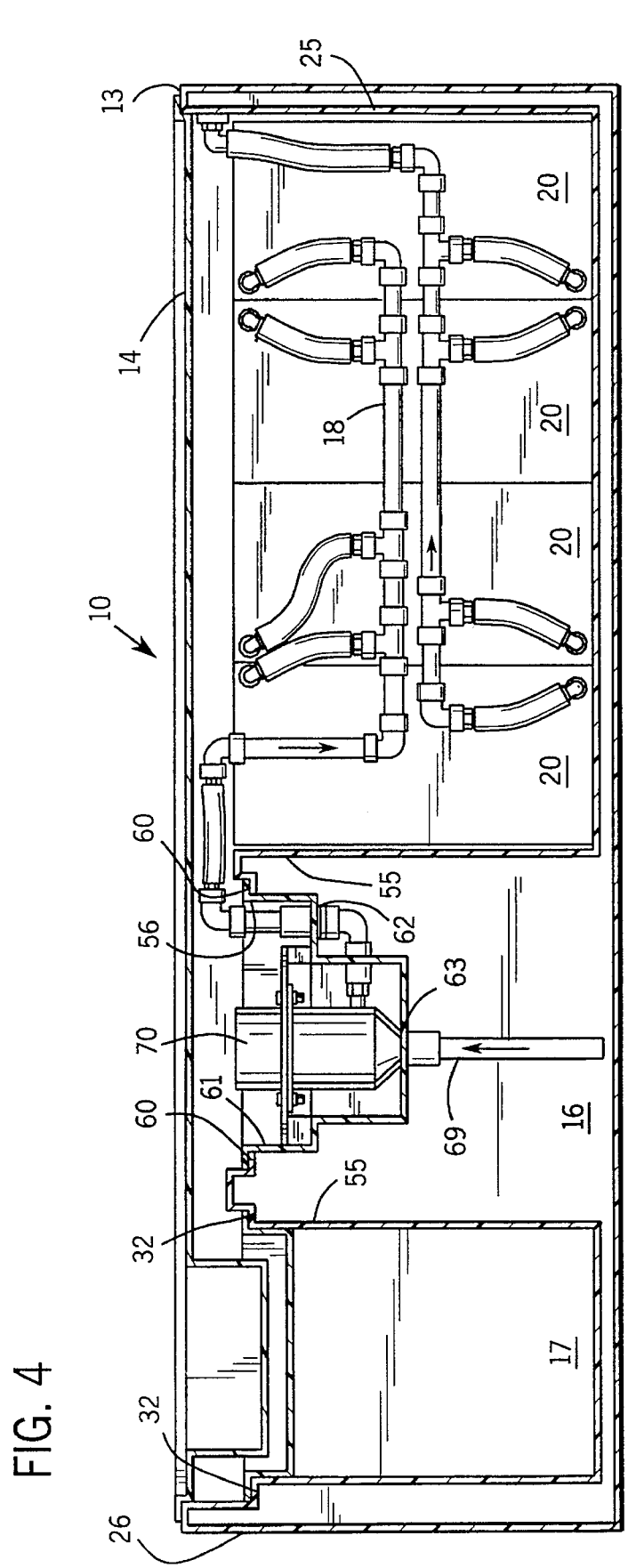
FIG. 4 is a rear, cross-sectional view of the module of the present invention.

The space between the innerwall 25 and outerwall 26 defines the anolyte reservoir 16 (FIGS. 3 and 4). The container 12 of the module 10 is designed so that the anolyte reservoir 16 surrounds the first compartment 30 and the catholyte reservoir 17. As can be seen by reference to FIG. 3, 4, and 5, the anolyte reservoir 16 surrounds the bottoms and sides of the first compartment 30 and the catholyte reservoir 17. Thus, the catholyte reservoir 17 may be considered as being in nested relation to, or positioned within, the anolyte reservoir 16.

The module is designed so that in the event of a puncture of the container 12, the anolyte reservoir 16 is breached first, allowing the less reactive anolyte contained therein to spill out of the module. In particular, the module employs a novel design where the effects of a severe puncture are lessened.

If a puncture occurs at the end of the module where the catholyte reservoir 17 is located, and is severe enough to breach it, the catholyte from the catholyte reservoir 17 mixes with the anolyte from the anolyte reservoir 16 before spilling from the module to the external environment. The less reactive anolyte mixes and reacts with the more reactive catholyte, thereby diminishing the hazardousness of a catholyte spill. In the event that a puncture of the container occurs at the end of the module containing the first compartment, and is severe enough to breach one or more of the batteries 20, electrolyte from the batteries mixes with the anolyte before spilling from the module 10. In the same manner noted above, such mixing diminishes the effects of an electrolyte spill.

In addition to a unique double-wall, nesting-electrolyte-reservoir construction, the module 10 has other features. Thermal management of the system is provided by a cooling circuit within the anolyte reservoir. Two openings 51 and 52 (FIG. 3) in the outerwall 26 provide a means through which cooling water may be circulated through a cooling circuit (not shown) placed within the anolyte reservoir 16.

As shown in FIG. 4, the anolyte reservoir 16 has a top portion 55 defined by the innerwall 25. Access to the anolyte reservoir 16 may be obtained through an opening 56 in the top portion 55. A shelf 60 is provided along the peripheral edge of the opening 55. A lid or panel 61 is mounted on the shelf 60. The panel 61 has a first opening 62 for accepting plumbing 18, and a second opening 63 for accepting an inlet pipe 69 of an anolyte pump 70.

Figure 5:
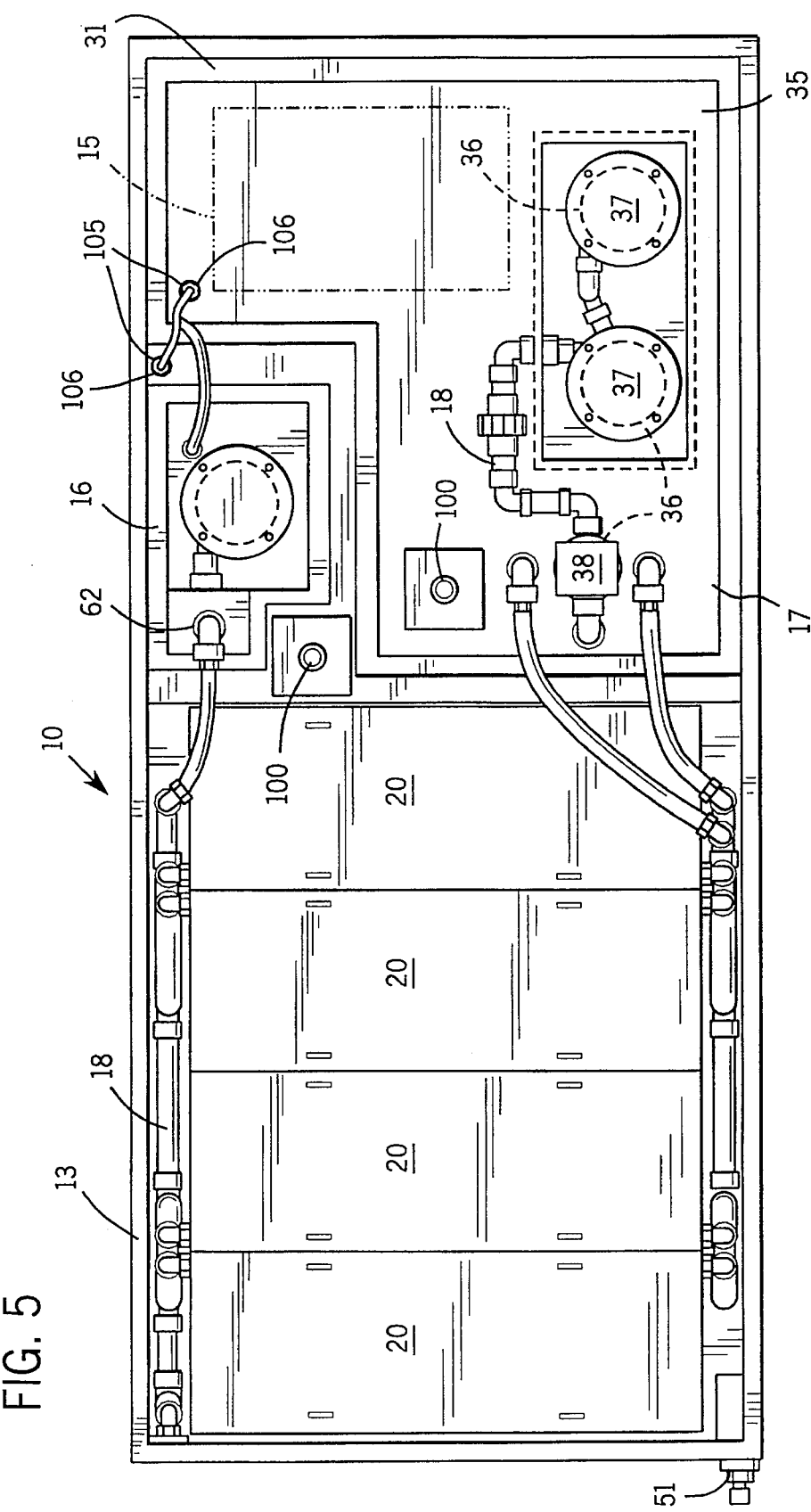
FIG. 5 is a top, plan view of the module of the present invention.

As shown in FIG. 5, each reservoir 16 and 17 has a fluid level indicator 100 mounted on the container 12. In addition, each reservoir has a fill-vent opening 105 which may be individually occluded by fill-vent caps 106.

The module 10 may be rotational or blow molded, using conventional techniques, from polymeric materials. Materials suitable for use in constructing a module of the present invention include polypropylene and high density polyethylene.

In the preferred embodiment, the module 10 has been designed to function with zinc-bromine batteries of present design. However, it should be understood that various electric energy storing devices, of various chemistries, may be used with the module. Thus, while the present invention has herein been described in what is believed to be the preferred embodiment, the invention is not confined to the particular construction and arrangement of parts herein illustrated and described, but embraces such modified forms as come within the scope of the following claims.

What we claim is:

1. A module for use with liquid electrolyte, electric energy storing devices, the module comprising:

a double-walled container having an innerwall, an outerwall located in spaced relation relative to the innerwall, and a top opening having a rim;

a first reservoir for holding a liquid defined by the inner and outer walls, and having a top portion with an opening therein;

a compartment for holding at least one electric energy storing device, defined by the innerwall, having a top opening with a peripheral edge, and surrounded by the first reservoir; and a second reservoir for holding a liquid, defined by the innerwall, having a top opening with a peripheral edge, and positioned in nested relationship relative to the first reservoir.

where, in operation, when liquid is stored in the second reservoir and in the first reservoir, liquid in the second reservoir will mix with liquid stored in the first reservoir in the event of a puncture of a portion of the innerwall which defines the second reservoir.

2. A module as claimed in claim 1, further comprising:

a first lid capable of being mounted in sealing, occluding relation with respect to the opening of the top portion of the first reservoir;

a second lid capable of being mounted in sealing, occluding relation with respect to the top opening of the second reservoir; and a cover capable of being mounted on the rim in sealing, occluding relation with respect to the top opening of the double-walled container.

3. A module for use with liquid electrolyte, electric energy storing devices, the module comprising:

a double-walled container having, a cross-sectionally C-shaped outerwall;

a cross-sectionally E-shaped innerwall integral with the outerwall and in spaced relation relative to the outerwall;

a first reservoir defined by the outerwall and the innerwall;

a first well for holding at least one electric energy storing device and defined by the innerwall;

a second well for functioning as a second reservoir and defined by the innerwall.

4. A module as claimed in claim 3, and wherein the first reservoir has a top opening having a peripheral edge and the innerwall defines a ledge around at least a portion of the peripheral edge of the top opening, and further comprising a lid mounted on the ledge.

5. A module as claimed in claim 4, further comprising at least one pump mounted on the lid.

6. A module as claimed in claim 3, and wherein the second well has a top opening having a peripheral edge and the innerwall defines a ledge around at least a portion of the peripheral edge of the top opening, and further comprising a lid mounted on the ledge.

7. A module as claimed in claim 6, further comprising at least one pump mounted on the lid.

8. A module as claimed in claim 3, wherein the innerwall and outerwall meet to define a rim, and further comprising a cover mounted on the rim in covering relation relative to the first and second wells.

9. A module for use with liquid electrolyte, electric energy storing devices, the module comprising:

a double-walled container having a cross-sectionally C-shaped outerwall, and a cross-sectionally E-shaped innerwall integral with the outerwall and located in spaced relation relative to the outerwall, and a top opening having a rim;

a first reservoir defined by the inner and outer walls, having a top portion with an opening therein, and capable of holding a liquid;

a compartment for holding at least one electric energy storing device, defined by the innerwall, having a top opening with a peripheral edge, and surrounded by the first reservoir; and a second reservoir defined by the innerwall, having a top opening with a peripheral edge, capable of holding a liquid, and positioned in nested relationship relative to the first reservoir, wherein, the first and second reservoirs are capable of being coupled in fluid flowing relation to the at least one electric energy storing device.

10. A module as claimed in claim 9, further comprising:

a first lid capable of being mounted in sealing, occluding relation with respect to the opening of the top portion of the first reservoir;

a second lid capable of being mounted in sealing, occluding relation with respect to the top opening of the second reservoir; and a cover capable of being mounted on the rim in sealing, occluding relation with respect to the top opening of the double-walled container.

11. A module as claimed in claim 10, further comprising at least one pump mounted on the first lid.

12. A module as claimed in claim 10, further comprising at least one pump mounted on the second lid.

13. A module for use with liquid electrolyte, electric energy storing devices, the module comprising:

a double-walled container having an innerwall, an outerwall located in spaced relation relative to the innerwall, and a top opening;

a first reservoir for holding a liquid, defined by the inner and outer walls, and having a top portion with an opening therein;

a compartment for holding at least one electric energy storing device, defined by the innerwall, having a top opening, and surrounded by the first reservoir; and a second reservoir for holding a liquid, defined by the innerwall, having a top opening with a peripheral edge, and positioned in nested relationship relative to the first reservoir, where, in operation, when liquid is stored in the second reservoir and in the first reservoir, liquid in the second reservoir is capable of mixing with liquid stored in the first reservoir in the event of a puncture of a portion of the innerwall which defines the second reservoir.

* * * * *